United States Patent
Tashiro et al.

(10) Patent No.: US 9,886,704 B2
(45) Date of Patent: Feb. 6, 2018

(54) ADVERTISEMENT DISTRIBUTION MANAGEMENT APPARATUS, ADVERTISEMENT DISTRIBUTION SYSTEM, AND ADVERTISEMENT DISTRIBUTION MANAGEMENT METHOD

(71) Applicant: YAHOO JAPAN CORPORATION, Tokyo (JP)

(72) Inventors: Takashi Tashiro, Tokyo (JP); Shinichiro Sega, Tokyo (JP); Naoki Ito, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 682 days.

(21) Appl. No.: 14/306,594

(22) Filed: Jun. 17, 2014

(65) Prior Publication Data

US 2014/0379488 A1  Dec. 25, 2014

(30) Foreign Application Priority Data

Jun. 19, 2013  (JP) .................................. 2013-129062

(51) Int. Cl.
*G06Q 30/00* (2012.01)
*G06Q 30/02* (2012.01)

(52) U.S. Cl.
CPC ..... *G06Q 30/0272* (2013.01); *G06Q 30/0273* (2013.01)

(58) Field of Classification Search
None
See application file for complete search history.

(56) References Cited

U.S. PATENT DOCUMENTS

| | | | | |
|---|---|---|---|---|
| 2008/0312996 A1* | 12/2008 | Ahopelto | ............... | G06Q 30/02 455/432.1 |
| 2009/0298480 A1* | 12/2009 | Khambete | ......... | G06F 17/30699 455/414.1 |
| 2011/0087531 A1* | 4/2011 | Winters | ................. | G06Q 20/10 705/14.17 |
| 2012/0123853 A1* | 5/2012 | Mehta | .................... | G06Q 30/02 705/14.41 |

FOREIGN PATENT DOCUMENTS

| | | | |
|---|---|---|---|
| JP | 2012073990 A | * | 4/2012 |
| JP | 2012093796 A | * | 5/2012 |
| JP | A-2012-93796 | | 5/2012 |

* cited by examiner

*Primary Examiner* — Meredith A Long
(74) *Attorney, Agent, or Firm* — Oliff PLC

(57) ABSTRACT

An advertisement distribution management apparatus in an embodiment includes a distribution management unit. The distribution management unit selectively executes a first operating mode selecting a distribution source apparatus of advertising content for an advertisement request from among the advertisement distribution apparatuses on the basis of a given condition and a second operating mode defining a specific advertisement distribution apparatus as the distribution source apparatus from among the advertisement distribution apparatuses depending on a user making the advertisement request. The distribution management unit further divides the users into a plurality of groups, and performs an assignment process assigning a plurality of time periods shifted from one another within a given period of time to the respective groups as the time periods of the second operating mode.

12 Claims, 5 Drawing Sheets

| GROUP | RATIO | FIRST DAY | SECOND DAY | THIRD DAY | FOURTH DAY |
|---|---|---|---|---|---|
| A | 25% | SECOND MODE | FIRST MODE | FIRST MODE | FIRST MODE |
| B | 25% | FIRST MODE | SECOND MODE | FIRST MODE | FIRST MODE |
| C | 25% | FIRST MODE | FIRST MODE | SECOND MODE | FIRST MODE |
| D | 25% | FIRST MODE | FIRST MODE | FIRST MODE | SECOND MODE |

| GROUP | RATIO | TIME PERIOD T1 | TIME PERIOD T2 | TIME PERIOD T3 | TIME PERIOD T4 |
|---|---|---|---|---|---|
| A | 25% | SECOND MODE | FIRST MODE | FIRST MODE | FIRST MODE |
| B | 25% | FIRST MODE | FIRST MODE | SECOND MODE | FIRST MODE |
| C | 25% | FIRST MODE | SECOND MODE | FIRST MODE | FIRST MODE |
| D | 25% | FIRST MODE | FIRST MODE | FIRST MODE | SECOND MODE |

| EXPECTED PROFIT VALUE RA | PRICE RANK |
|---|---|
| BELOW 0.1/Zone1 | Rank1 |
| 0.1 OR HIGHER AND BELOW 0.2/Zone2 | Rank2 |
| 0.2 OR HIGHER AND BELOW 0.3/Zone3 | Rank3 |
| 0.3 OR HIGHER AND BELOW 0.4/Zone4 | Rank4 |
| 0.4 OR HIGHER/Zone5 | Rank5 |

FIG.7

ADVERTISEMENT DISTRIBUTION MANAGEMENT APPARATUS, ADVERTISEMENT DISTRIBUTION SYSTEM, AND ADVERTISEMENT DISTRIBUTION MANAGEMENT METHOD

CROSS-REFERENCE TO RELATED APPLICATIONS

The present application claims priority to and incorporates by reference the entire contents of Japanese Patent Application No. 2013-129062 filed in Japan on Jun. 19, 2013.

BACKGROUND OF THE INVENTION

1. Field of the Invention

The present invention relates to an advertisement distribution management apparatus, an advertisement distribution system, and an advertisement distribution management method.

2. Description of the Related Art

Along with the rapid spread of the Internet in recent years, advertisement distribution via the Internet has been conducted frequently. For example, conducted is the advertisement distribution in which advertising content such as businesses and goods is displayed in an advertising space defined in an advertising medium (a web page, for example), and when such an advertising content is clicked, the web page is changed to a web page of an advertiser.

Media companies that own advertising media include those that sell a part of their advertising space inventory to advertisers while consigning the sale of the rest of the advertising space inventory to advertisement providers, and those that consign the sale of all of their advertising space inventory to advertisement providers, for example.

When a posting price of advertising content is determined on the basis of a bid price and advertising effectiveness (e.g., click-through rate (CTR)) specified by advertisers, for example, the profit of a media company from the advertising space may vary depending on whether a distribution source of advertising content (hereinafter, described as an advertisement distribution source) is the media company or an advertisement provider. Furthermore, when the sale of all the advertising space inventory is consigned to a plurality of advertisement providers, the profit of the media company may also vary depending on which advertisement provider is defined as the advertisement distribution source.

For a media company, it is desirous to maximize the profit from the advertising space, and thus the selection of an advertisement distribution source is desired to be conducted appropriately. Consequently, a technology that estimates effective cost per mille (eCPM) for each advertising content and selects an advertisement distribution source on the basis of the estimated eCPM has been developed to improve the profit of a media company (see Japanese Laid-open Patent Publication No. 2012-093796, for example).

With the technology described in Japanese Laid-open Patent Publication No. 2012-093796, however, an advertisement distribution source may be selected in an unbalanced manner for some users, and in such a case, profit estimation may become difficult for advertisement distribution sources not selected for those users. Thus, an improvement in profit from the advertising space concerning those users may not be achieved.

SUMMARY OF THE INVENTION

An advertisement distribution management apparatus according to an embodiment includes a reception unit and a distribution management unit. The reception unit receives advertisement requests for requesting distribution of advertising content from terminal apparatuses of a plurality of users. The distribution management unit selectively executes a first operating mode in which a distribution source apparatus of advertising content for the advertisement request is selected from among a plurality of advertisement distribution apparatuses on the basis of a given condition and a second operating mode in which a specific advertisement distribution apparatus is defined as the distribution source apparatus from among the advertisement distribution apparatuses depending on a user who makes the advertisement request. The distribution management unit divides the users into a plurality of groups and performs an assignment process in which a plurality of time periods shifted from one another within a given period of time are assigned to the respective groups as time periods of the second operating mode.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes in detail exemplary embodiments of an advertisement distribution management apparatus, an advertisement distribution system, an advertisement distribution management method, and an advertisement distribution management program according to the present application with reference to the accompanying drawings. The advertisement distribution management apparatus, the advertisement distribution system, the advertisement distribution management method, and the advertisement distribution management program in the present application, however, are not intended to be limited by the embodiments.

1. Advertisement Distribution Processing

Figure 1A:
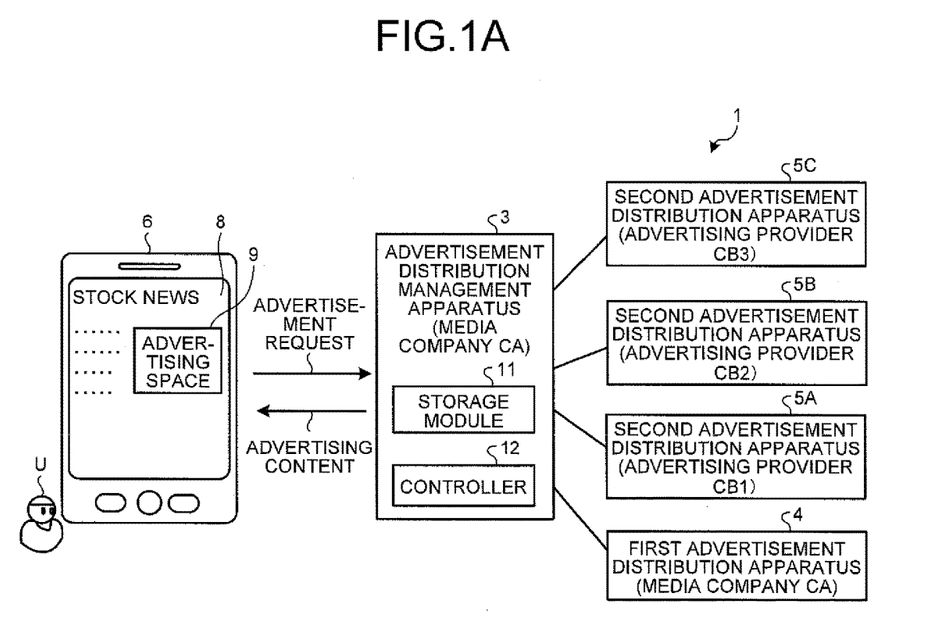
FIG. 1A is a diagram illustrating an advertisement distribution management process according to one embodiment.

Advertisement distribution processing according to one embodiment will be described first. FIG. 1A is an explanatory diagram of the advertisement distribution processing in the embodiment, and the advertisement distribution processing is executed by an advertisement distribution system in the embodiment.

As illustrated in FIG. 1A, an advertisement distribution system 1 in the embodiment includes an advertisement distribution management apparatus 3, a first advertisement distribution apparatus 4, and second advertisement distribution apparatuses 5A to 5C, and the foregoing apparatuses are connected via a communication network to be able to communicate with one another. In the following description, the second advertisement distribution apparatuses 5A to 5C may be collectively referred to as a second advertisement distribution apparatus 5.

The advertisement distribution management apparatus 3 and the first advertisement distribution apparatus 4 are managed and operated by a media company CA, and the second advertisement distribution apparatus 5A is managed and operated by an advertisement provider CB1, for example. Furthermore, the second advertisement distribution apparatus 5B is managed and operated by an advertisement provider CB2, and the second advertisement distribution apparatus 5C is managed and operated by an advertisement provider CB3, for example.

A terminal apparatus 6 transmits an advertisement request to the advertisement distribution management apparatus 3. Such an advertisement request is a distribution request for advertising content to display in an advertising space 9 defined on a web page 8, for example. While a web page is explained as one example of an advertising medium here, when the terminal apparatus 6 is installed with application programs such as electronic games, electronic books, and movie streaming, the advertising space 9 may be provided on display screens of such application programs and defined as an advertising medium, for example. In this case, an advertisement request corresponding to the advertising space 9 is also transmitted from the terminal apparatus 6 to the advertisement distribution management apparatus 3 by the application programs.

When a controller 12 of the advertisement distribution management apparatus 3 receives an advertisement request from the terminal apparatus 6, the controller 12 selects and executes an operating mode depending on a user U of the terminal apparatus 6. The operating modes selected by the controller 12 include a first operating mode and a second operating mode.

When the operating mode for the user U is the first operating mode, the controller 12 selects an advertisement distribution apparatus that distributes advertising content for the advertisement request from among the first advertisement distribution apparatus 4 and the second advertisement distribution apparatuses 5A to 5C (hereinafter, may be described as a distribution source apparatus) on the basis of a given condition.

The controller 12 obtains an expected profit value RA in the case of distributing the advertising content for the advertisement request by the first advertisement distribution apparatus 4, for example. The expected profit value RA is an effective cost per mille (eCPM) expected by the distribution of advertising content for an advertisement request, for example.

When any of the second advertisement distribution apparatuses 5A to 5C is capable of distributing at a price rank set based on the expected profit value RA (hereinafter described as a set price rank), the controller 12 makes the second advertisement distribution apparatus 5 distribute the advertising content for the advertisement request. In contrast, when none of the second advertisement distribution apparatuses 5A to 5C is capable of distributing at the price rank set based on the expected profit value RA, the controller 12 makes the first advertisement distribution apparatus 4 distribute the advertising content for the advertisement request.

Consequently, by setting a set price rank in which the profit equal to or higher than the expected profit value RA is gained, for example, the profit equal to or higher than the expected profit value RA by the first advertisement distribution apparatus 4 can be gained even when it is not known which of the first advertisement distribution apparatus 4 and the second advertisement distribution apparatuses 5A to 5C provides higher profit by the advertisement distribution, whereby the profit from the advertising space 9 can be improved.

Furthermore, the controller 12 may be able to acquire expected profit values RB1 to RB3 (hereinafter, collectively referred to as an expected profit value RB) in the case of distributing the advertising content for the advertisement request by the second advertisement distribution apparatuses 5A to 5C. In this case, the controller 12, in the first operating mode, can define the advertisement distribution apparatus corresponding to the highest expected profit value from among the expected profit values RA and RB1 to RB3 as the distribution source apparatus, for example, whereby the profit from the advertising space 9 can be improved.

As in the foregoing, in the first operating mode, the distribution source apparatus is selected from among the first advertisement distribution apparatus 4 and the second advertisement distribution apparatuses 5A to 5C on the basis of expected profit values of the advertisement distribution apparatuses, and thus the profit from the advertising space 9 can be improved.

Meanwhile, when the operating mode for the user U is the second operating mode, the controller 12 selects the first advertisement distribution apparatus 4 as the advertisement distribution apparatus to distribute advertising content for the advertisement request. Specifically, the controller 12 divides a plurality of users U into a plurality of groups, and performs an assignment process in which a plurality of time periods shifted from one another within a given period of time are assigned to the respective groups as the time periods of the second operating mode.

Figure 1B:
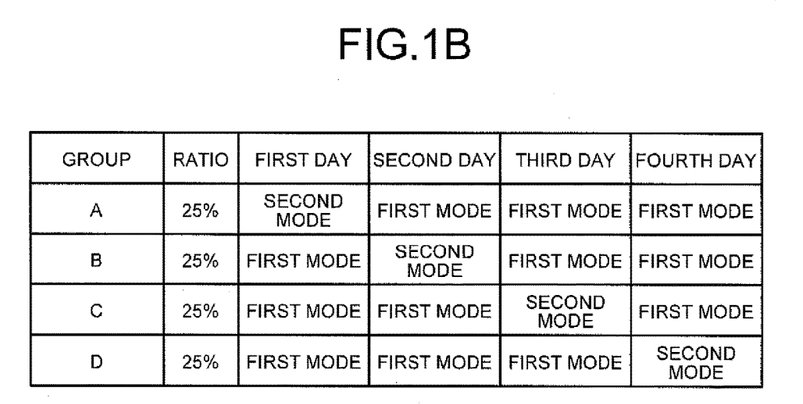
FIG. 1B is a table illustrating one example of operating mode assignment.

FIG. 1B is a table illustrating one example of an operating-mode assignment table. The operating-mode assignment table illustrated in FIG. 1B is the information for, when the users U are divided into groups A to D, assigning the time period of the second operating mode to each of the groups A to D, and is stored in a storage unit 11.

As illustrated in FIG. 1B, time periods shifted from one another (the first day, the second day, the third day, and the fourth day) are defined within a given period of time (for four days). Furthermore, the groups A to D are defined such that the respective numbers of users are equal. The group A is assigned to the time period of "the first day", the group B is assigned to the time period of "the second day", the group C is assigned to the time period of "the third day", and the group D is assigned to the time period of "the fourth day".

The controller 12 selects and executes the operating mode for the user U on the basis of the operating-mode assignment table stored in the storage unit 11. For example, when the user U belonging to the group A makes an advertisement request during the time period of "the first day", the controller 12 selects the second operating mode and makes the first advertisement distribution apparatus 4 distribute the advertising content. When the user U belonging to one of the groups B to D makes an advertisement request during the time period of "the first day", the controller 12 selects the first operating mode and makes an advertisement distribution apparatus, which is selected from among the first advertisement distribution apparatus 4 and the second advertisement distribution apparatuses 5A to 5C, distribute the advertising content.

Furthermore, in the time period of "the second day", the controller 12 selects the second operating mode for the users U belonging to the group B, and selects the first operating mode for the users U belonging to the groups A, C, and D. In the time period of "the third day", the controller 12 selects the second operating mode for the users U in the group C, and selects the first operating mode for the users U belonging to the groups A, B, and D. In the time period of "the fourth day", the controller 12 selects the second operating mode for the users U belonging to the group D, and selects the first operating mode for the users U belonging to the groups A to C.

As in the foregoing, in the advertisement distribution system 1 in the embodiment, the first advertisement distribution apparatus 4 is selected for the users U of all the groups A to D in the given period of time (for four days). Consequently, even for the user U for whom only the second advertisement distribution apparatus 5 is selected in the first operating mode, the first advertisement distribution apparatus 4 is selected in the second operating mode, and thus the information of the user U can be collected.

The information of the user U is the information of Hypertext Transfer Protocol (HTTP) cookie (hereinafter referred to as a cookie), the presence of click for advertising content, the presence of conversion, and others, and is the information necessary for the calculation of an expected profit value RA. Being able to acquire such information of the user U enables the expected profit value RA to be obtained accurately, whereby the profit from the advertising space 9 can be improved.

Figure 2:
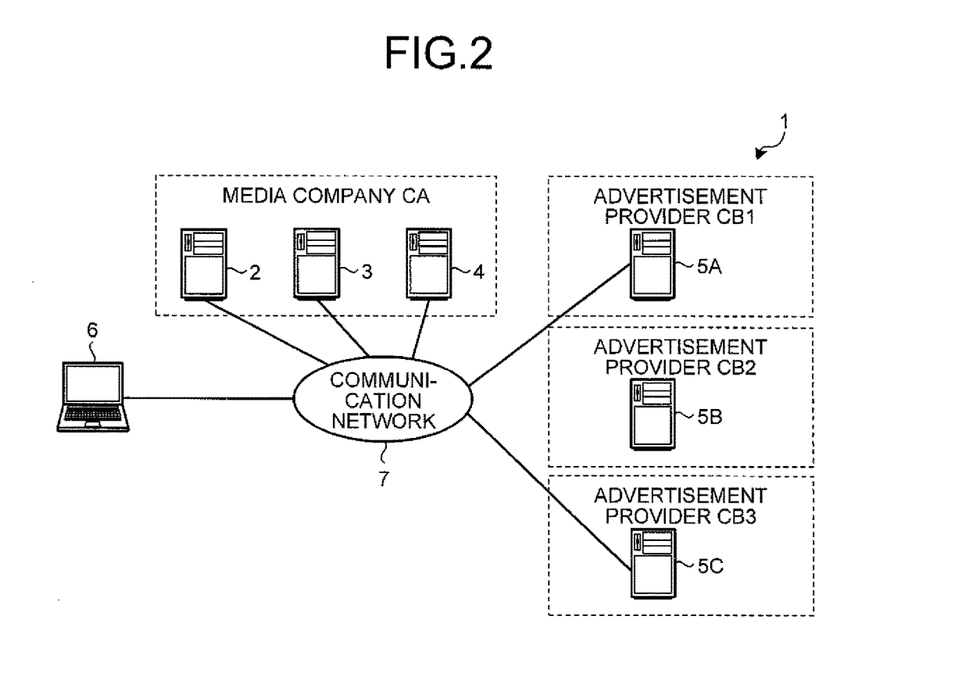
FIG. 2 is a diagram illustrating an example configuration of an advertisement distribution system in the embodiment.

For example, a cookie includes an access history of web pages in a web server 2 (see FIG. 2). The advertisement distribution management apparatus 3 can determine, by acquiring the cookie, whether the user U who made an advertisement request is a subject of retargeting advertising. When the user U is the subject of retargeting advertising, the expected profit value RA increases relatively. Consequently, it can be avoided that the expected profit value RA is not increased because of being unable to acquire a cookie even though higher profit can be expected when the advertisement distribution is made by the first advertisement distribution apparatus 4, whereby the profit from the advertising space 9 can be improved.

The users U who are divided into the groups A to D are not necessary all the users U of the terminal apparatus 6 that transmits an advertisement request to the advertisement distribution management apparatus 3. For example, dividing a given ratio (80%, for example) of the users U from among all the users U of the terminal apparatus 6, which transmits an advertisement request to the advertisement distribution management apparatus 3, into the groups A to D can improve the profit from the advertising space 9 according to the given ratio.

Furthermore, while the first advertisement distribution apparatus 4 is exemplified to be managed and operated by the media company CA, the first advertisement distribution apparatus 4 may be managed and operated by an advertisement provider other than the media company CA as long as the expected profit value RA by the first advertisement distribution apparatus 4 can be acquired. In other words, all of the advertisement distribution apparatuses may be managed and operated by advertisement providers other than the media company CA.

2. Advertisement Distribution System 1

Next, a configuration example of the advertisement distribution system 1 in the embodiment will be described with reference to FIG. 2. The number of the second advertisement distribution apparatuses 5 is not limited to three, and it may be two or less, or it may be four or more.

As illustrated in FIG. 2, the advertisement distribution system 1 in the embodiment includes the web server 2, the advertisement distribution management apparatus 3, the first advertisement distribution apparatus 4, and the second advertisement distribution apparatuses 5A to 5C. The foregoing apparatuses are connected via a communication network 7 to be able to communicate with one another. The communication network 7 is the Internet, for example.

The terminal apparatus 6 is a personal computer (PC), a personal digital assistant (PDA), or a smartphone used by a user U, for example, and is installed with a browser application (hereinafter, described as a browser).

The web server 2 stores therein a plurality of web pages defined with advertising spaces. When the web server 2 is accessed from the browser of the terminal apparatus 6 via the communication network 7, a controller of the web server 2 provides a web page corresponding to an uniform resource locator (URL) specified by the terminal apparatus 6.

When the browser of the terminal apparatus 6 receives the web page from the web server 2, the browser transmits an advertisement request corresponding to an advertising space defined on the web page to the advertisement distribution management apparatus 3. The advertisement request is a distribution request for advertising content to display in the advertising space, and includes identification information of the user U of the terminal apparatus 6 (hereinafter, described as a user ID), and identification information of the advertising space (hereinafter, described as an advertising space ID), for example. The user ID is an HTTP cookie, for example. Such a cookie includes, other than the user ID, an access history of web pages in the web server 2, and can include the age, sex, and others of the user U.

The advertisement distribution management apparatus 3 selects the first operating mode or the second operating mode for the group corresponding to the user U of the terminal apparatus 6 who made the advertisement request, and makes the advertisement distribution apparatus, which is determined by executing the selected operating mode, distribute the advertising content.

When the second advertisement distribution apparatus 5 receives an inquiry of advertisement distribution from the advertisement distribution management apparatus 3, the second advertisement distribution apparatus 5 determines whether to make the advertisement distribution. When the second advertisement distribution apparatus 5 determines to make the advertisement distribution, the second advertisement distribution apparatus 5 transmits a reply indicating that it can distribute to the advertisement distribution management apparatus 3. On the other hand, when the second advertisement distribution apparatus 5 determines not to make the advertisement distribution, the second advertisement distribution apparatus 5 transmits a reply indicating that it cannot distribute to the advertisement distribution management apparatus 3.

3. Advertisement Distribution Management Apparatus 3

Figure 3:
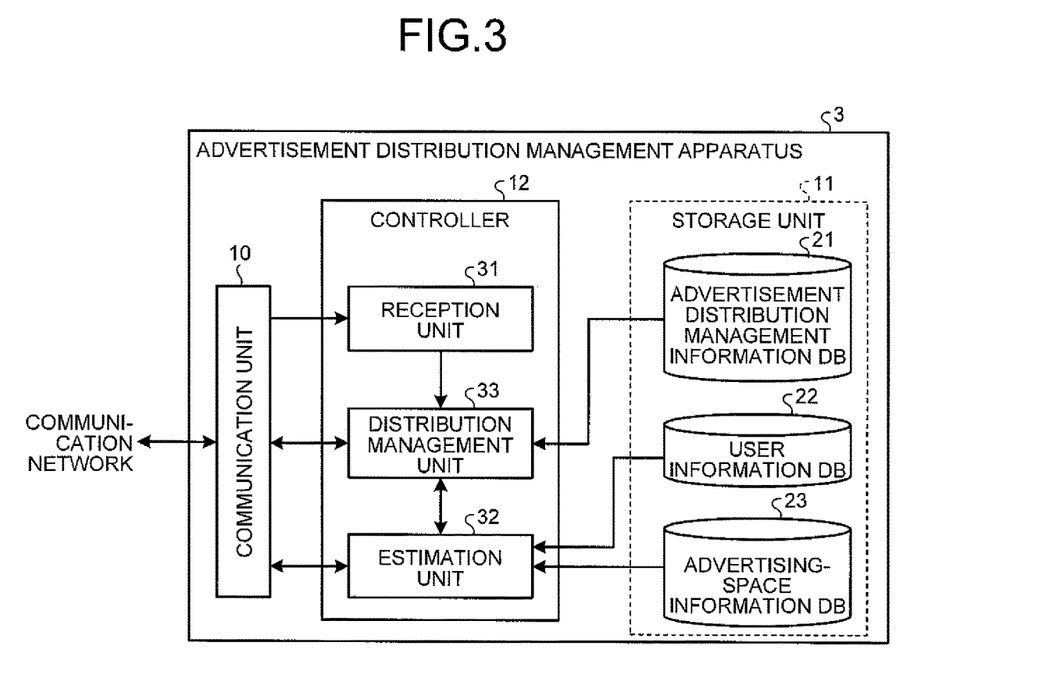
FIG. 3 is a block diagram illustrating an example configuration of an advertisement distribution management apparatus in the embodiment.

FIG. 3 is a block diagram illustrating an example configuration of the advertisement distribution management apparatus 3. As illustrated in FIG. 3, the advertisement distribution management apparatus 3 includes a communication unit 10, the storage unit 11, and the controller 12.

The communication unit 10 is an communication interface that transmits and receives information to and from the communication network 7, and the connection to the communication network 7 is made in a wired or wireless manner. The controller 12 can transmit and receive various information to and from the first advertisement distribution apparatus 4, the second advertisement distribution apparatuses 5A to 5C, and the terminal apparatus 6 via the communication unit 10 and the communication network 7.

The storage unit 11 includes a distribution management information database (DB) 21, a user information DB 22, and an advertising-space information DB 23. The distribution management information DB 21, the user information DB 22, and the advertising-space information DB 23 are, for example, a semiconductor memory device such as a random access memory (RAM) and a flash memory, or a storage device such as a hard disk and an optical disc.

The controller 12 performs the advertisement distribution management processing. The controller 12 is implemented by an integrated circuit such as an application specific integrated circuit (ASIC) and a field programmable gate array (FPGA), for example. The controller 12 functions as a reception unit 31, an estimation unit 32, and a distribution management unit 33, by an internal central processing unit (CPU) or a micro processing unit (MPU) executing a program (one example of the advertisement distribution management program) stored in an internal storage device with the RAM as a work area.

The configuration of the controller 12, however, is not limited to such a configuration, and other configurations may be used as long as the controller 12 is configured to perform later described information processing. Furthermore, the advertisement distribution management apparatus 3 includes a reading device not illustrated. After reading a program recorded on a recording medium into the internal storage device via the reading device, the controller 12 can implement the above-described functions of the controller 12 by executing the program. The recording medium includes an optical disc, a flexible disk, and a hard disk.

3.1. Reception Unit 31

The reception unit 31 receives an advertisement request from the terminal apparatus 6. The advertisement request includes the information of cookie and an advertising space ID. The cookie includes a user ID of the user U. The reception unit 31 outputs the information of the received advertisement request to the estimation unit 32 and the distribution management unit 33.

3.2. Estimation Unit 32

The estimation unit 32 estimates the expected profit value RA in the case of distributing advertising content for an advertisement request by the first advertisement distribution apparatus 4, and outputs the information of the estimated expected profit value RA to the distribution management unit 33. The estimation unit 32 estimates the expected profit value RA from the information of the attribute of the user U, advertising space, and others, for example, by a statistical method using an estimation model.

The attribute of the user U includes the age, sex, location, and preference of the user U, and his/her access history of web pages, for example. The information of advertising space includes the type, size, location within a page, click frequency, display frequency, and average display time of the advertising space, for example. The click frequency is the frequency of advertising content in the advertising space being clicked within a preceding given period of time. The display frequency is the frequency of the advertising content being displayed in the advertising space within a preceding given period of time. The average display time is a past average display time of the web page on which the advertising space is defined.

The user information DB 22 stores therein the attribute information of the user U, such as the age, sex, location, and preference, being associated with a user ID, and the estimation unit 32 acquires the attribute information of the user U from the user information DB 22 on the basis of the user ID included in the advertisement request. The cookie includes the information of access history of web pages, and thus the estimation unit 32 also acquires the attribute information of the user U from the cookie. When the cookie includes the user attribute such as the age and sex of the user U, the estimation unit 32 can also acquire the age and sex, for example, of the user U from the cookie.

The advertising-space information DB 23 stores therein the information of advertising space, such as the type, size, location within the page, click frequency, display frequency, and average display time, being associated with an advertising space ID. The estimation unit 32 acquires the information of advertising space from the advertising-space information DB 23 on the basis of the advertising space ID included in the advertisement request.

Furthermore, when the expected profit value RA is assumed to be an expected eCPM value, for example, the estimation unit 32 obtains an expected click-through rate (CTR) value and an expected cost per click (CPC) value, and then multiplies the expected CTR value and the expected CPC value together to obtain the expected profit value RA.

The expected CTR value is an expected value of CTR for the advertisement request. The estimation unit 32, by using the click on the advertising content in the advertising space as a dependent variable and using the above-described attribute information of the user U and the information of advertising space as independent variables (explanatory variables), obtains the expected CTR value by support vector machine (SVM) and sigmoidal fitting, for example. Furthermore, the estimation unit 32 can obtain the expected CTR value by logistic regression analysis, for example.

The expected CPC value is an expected value of CPC for the advertisement request. The estimation unit 32, by using a distribution unit price of the advertising content that is a distribution candidate for the advertisement request (CPC and cost per action (CPA), for example) as a dependent variable and using the above-described attribute information of the user U and the information of advertising space as independent variables (explanatory variables), obtains the expected CPC value by multiple regression analysis or Poisson regression analysis, for example.

The advertising content that is a distribution candidate for the advertisement request is the advertising content distributed by the first advertisement distribution apparatus 4 for the advertisement request received by the reception unit 31. The estimation unit 32 makes an inquiry to the first advertisement distribution apparatus 4 about the distribution unit price of the advertising content that is a distribution candidate for the advertisement request, and acquires the distribution unit price from the first advertisement distribution apparatus 4, for example.

While an expected eCPM value is an expected profit value per 1,000 impressions, the number of impressions per unit is not limited to 1,000. The estimation unit 32 can obtain the expected profit value per one impression and the expected profit value per 10 impressions as the expected profit value RA, for example.

3.3. Distribution Management Unit 33

The distribution management unit 33 assigns, when the information of advertisement request is received from the reception unit 31, the user U who made the advertisement request (hereinafter, described as a request user U) to any one of the groups on the basis of the cookie included in the advertisement request.

For example, the distribution management unit 33 obtains a hash value by calculating the user ID included in the cookie by a given hash function, and on the basis of the obtained hash value, assigns the request user U to a group. When the numerals of predetermined two consecutive digits (the last two digits, for example) of the hash value are 00 to 24, 25 to 49, 50 to 74, or 75 to 99, the distribution management unit 33 assigns the user U to the group A, the group B, the group C, or the group D, respectively, for example.

Sorting the request users U into groups by the hash value in this manner allows the request users U to be sorted into the respective groups evenly. Furthermore, if the user ID is generated by a hash value, the request user U may be assigned to a group on the basis of the user ID, or may be assigned to a group in other methods.

The distribution management unit 33, after assigning the request user U to a group, selects either one of the first operating mode and the second operating mode as the operating mode for the advertisement request on the basis of the group to which the request user U is assigned. The selection of operating mode by the distribution management unit 33 is made on the basis of the operating-mode assignment table.

Figure 4:
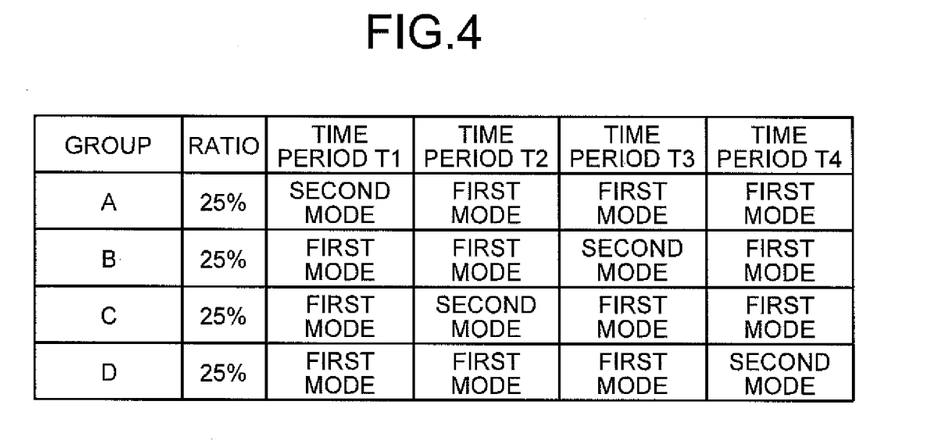
FIG. 4 is a table illustrating one example of an operating-mode assignment table.

FIG. 4 is a table illustrating one example of the operating-mode assignment table stored in the distribution management information DB 21. As illustrated in FIG. 4, the operating-mode assignment table is the information associating each of the groups A to D with the respective operating modes in time periods TB1 to TB4. While the number of groups here is defined as four, the number of groups is not limited to four, and it may be two or three, or may be five or more, for example.

Figure 5A:
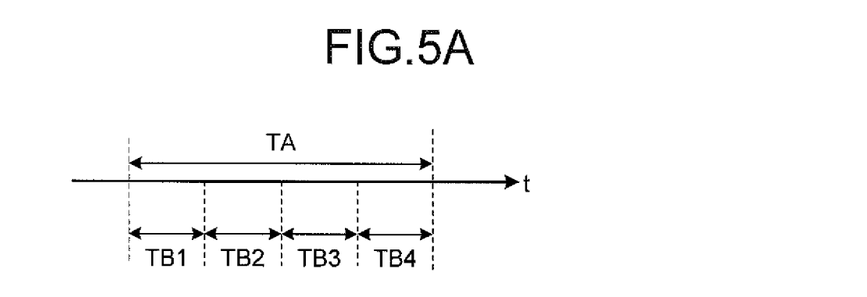
FIGS. 5A and 5B are diagrams illustrating examples of the relation of a given period of time and switching time periods.
Figure 5B:
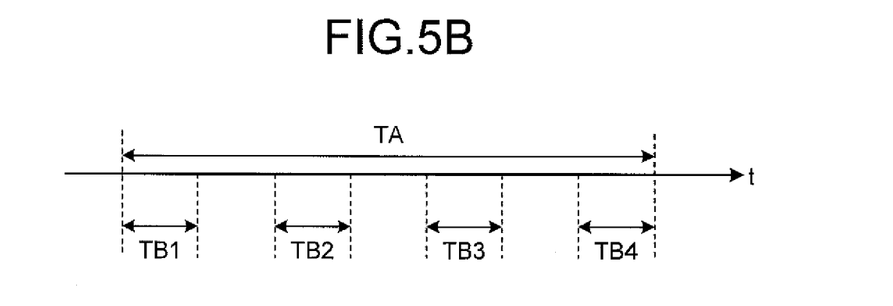

FIGS. 5A and 5B are diagrams illustrating examples of the relation of a given period of time TA and the time periods TB1 to TB4. The time periods TB1 to TB4 are time periods shifted from one another within the given period of time TA, and as illustrated in FIG. 5A, can be defined as consecutive time periods. When the time periods TB1 to TB4 are defined consecutively in a unit of one day, the operating-mode assignment table is defined as illustrated in FIG. 1B, for example. Furthermore, the time period TB can be defined in a unit of two days or in a unit of a half day, for example.

Because the second operating mode is assigned to the groups A to D in the time periods TB1 to TB4 by the operating-mode assignment table illustrated in FIG. 4, the first advertisement distribution apparatus 4 is reliably selected for the users U in all of the groups A to D within the given period of time TA. Consequently, even for the users U for whom only the second advertisement distribution apparatus 5 is selected in the first operating mode, the first advertisement distribution apparatus 4 is selected in the second operating mode, and thus the estimation accuracy of the expected profit value RA can be prevented from deteriorating and the profit from the advertising space can be improved.

Furthermore, because the request users U are sorted into the respective groups evenly, when the time periods TB1 to TB4 are consecutive, the ratio of the request users U assigned to each group in each of the time periods TB is 25% of the whole request users U. Accordingly, the ratio of the request users U assigned to the second operating mode is 25% of the whole request users U, and 75% of the whole request users U are assigned to the first operating mode.

In the manner described above, the request users U can be accurately assigned to the first advertisement distribution apparatus 4 in a unit of group while an influence on the first operating mode is reduced. When sorting the request users U into the respective groups evenly, increasing the number of groups, into which the request users U are sorted, can further reduce the influence on the first operating mode. Defining the number of groups, into which the request users U are sorted, to be eight assigns 87.5% of the whole request users U to the first operating mode, for example.

Furthermore, the time periods TB1 to TB4 are not necessary consecutive time periods, and as illustrated in FIG. 5B, they can be defined with intervals. For example, by defining a given period of time TA as one week, the time periods TB1 to TB4 in a unit of one day can be defined with an interval of one day between the periods. Consequently, in the given period of time TA, there can be a mixture of the time periods in which the whole request users U are assigned to the first operating mode and the time periods in which a part of the request users U is assigned to the second operating mode, and thus the influence on the first operating mode can be further reduced in the whole given period of time TA.

The distribution management unit 33 can repeat the given period of time TA, in which the second operating mode is assigned, according to a given rule. For example, the distribution management unit 33 can perform a process of assigning the second operating mode by providing the given period of time TA in a predefined cycle (once-a-week cycle or once-a-month cycle, for example). This allows the advertisement requests of the request users U in all the groups to be received on a regular basis, and thus the estimation accuracy of the expected profit value RA can be prevented from deteriorating.

Furthermore, the distribution management unit 33 can perform the process of assigning the second operating mode by providing the given period of time TA in a cycle determined on the basis of the number of advertisement requests received by the reception unit 31. For example, the distribution management unit 33 shortens the cycle of providing the given period of time TA when the number of advertisement requests is large, and extends the cycle of providing the given period of time TA when the number of advertisement requests is small. This can also reduce the influence on the first operating mode.

The distribution management unit 33 can also adjust the cycle of providing the given period of time TA depending on how much the expected profit value RA changes before and after performing the second operating mode. For example, the distribution management unit 33 shortens the cycle of providing the given period of time TA when the change in the expected profit value RA before and after performing the second operating mode is large, and extends the cycle of providing the given period of time TA when the change in the expected profit value RA before and after performing the second operating mode is small. Consequently, the estimation accuracy of the expected profit value RA can be further prevented from deteriorating.

Furthermore, the distribution management unit 33 can also change the number of groups into which the request users U are sorted according to a given rule. For example, the distribution management unit 33 increases the number of groups when the number of advertisement requests is large, and decreases the number of groups when the number of advertisement request is small. This enables a given ratio of the whole request users U to be assigned to the first operating mode, and thus the estimation accuracy of the expected profit value RA can be further prevented from deteriorating while the influence on the first operating mode is reduced.

While the request users U are exemplified to be evenly divided into the respective groups in the foregoing, the distribution management unit 33 can also change the sorting ratio of the request users U for each group. In this case, the distribution management unit 33 can adjust the time period TB depending on the sorting ratio of the request users U. For example, the distribution management unit 33 shortens the time period TB of the group for which the sorting ratio of the request users U is high, and extends the time period TB of the group for which the sorting ratio of the request users U is low. Configuring the time period TB in this manner can reduce the influence on the first operating mode even when the sorting ratio of the request users U is changed for each group.

When the distribution management unit 33 selects the first operating mode on the basis of the operating-mode assignment table, the distribution management unit 33 acquires the information of the expected profit value RA from the estimation unit 32 and assigns a price rank corresponding to the expected profit value RA for the advertisement request. The distribution management information DB 21 stores therein a price condition table, and the distribution management unit 33 assigns the price rank corresponding to the expected profit value RA for the advertisement request on the basis of the price condition table.

Figure 6:
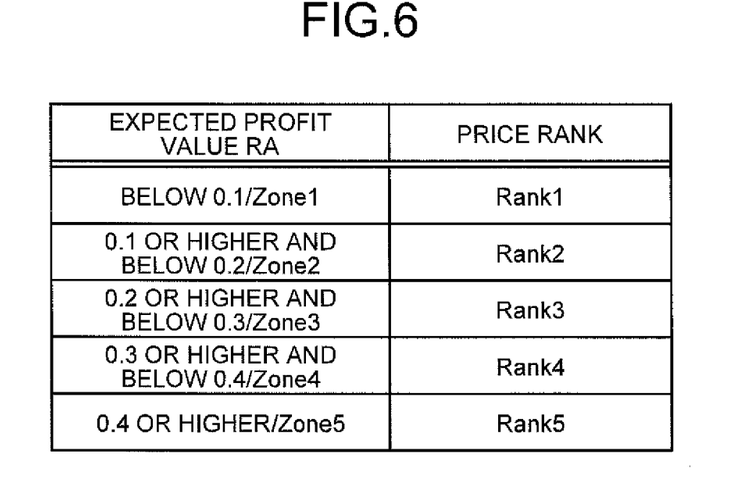
FIG. 6 is a table illustrating one example of a price condition table.

FIG. 6 is a table illustrating one example of the price condition table stored in the distribution management information DB 21. The price condition table illustrated in FIG. 6 is the information associating the range of the expected profit value RA with the price rank, and the expected profit value RA is associated with a first price rank of "Rank 1" to a fifth price rank of "Rank 5" in stages according to the range of the expected profit value RA.

While the price condition table is in a state as illustrated in FIG. 6, when the expected profit value RA acquired from the estimation unit 32 is in a range of below 0.1, for example, the distribution management unit 33 assigns the first price rank of "Rank 1" for the advertisement request. When the expected profit value RA acquired from the estimation unit 32 is in a range of 0.3 or higher and below 0.4, for example, the distribution management unit 33 assigns the fourth price rank of "Rank 4" for the advertisement request.

The distribution management unit 33 makes an inquiry to one or more second advertisement distribution apparatuses 5 about whether to make the distribution of advertising content for the advertisement request at a set price rank that is the price rank assigned on the basis of the price condition table.

Specifically, the distribution management unit 33 determines the second advertisement distribution apparatus 5 to which an inquiry is made, and transmits a distribution query to the determined second advertisement distribution apparatus 5. The distribution query can include, other than the information of a set price rank, the attribute information of the user U, the information of an advertising space, and others, for example. The second advertisement distribution apparatus 5 determines whether to make the distribution of advertising content for the advertisement request on the basis of the information included in the distribution query.

When the distribution management unit 33 receives a reply from the second advertisement distribution apparatus 5 indicating that it can distribute in response to the distribution query, the distribution management unit 33 selects the second advertisement distribution apparatus 5 that made the reply indicating that it can distribute as the distribution source apparatus of the advertising content for the advertisement request.

In contrast, when the distribution management unit 33 receives a replay from the second advertisement distribution apparatus 5 indicating that it cannot distribute in response to the distribution query, and when another second advertisement distribution apparatus 5 to which the distribution query is not yet transmitted is present, the distribution management unit 33 transmits the distribution query to the other second advertisement distribution apparatus 5. When the distribution management unit 33 receives a reply from the second advertisement distribution apparatus 5 indicating that it can distribute in response to the distribution query, the distribution management unit 33 selects the second advertisement distribution apparatus 5 that made the reply indicating that it can distribute as the distribution source apparatus.

When all of the one or more second advertisement distribution apparatuses 5 that are the destinations of the distribution query make a reply indicating that they cannot distribute, the distribution management unit 33 ends the inquiry process and selects the first advertisement distribution apparatus 4 that made a reply indicating that it can distribute as the distribution source apparatus.

Meanwhile, when the distribution management unit 33 selects the second operating mode on the basis of the operating-mode assignment table, the distribution management unit 33 selects the first advertisement distribution apparatus 4 that made a reply indicating that it can distribute as the distribution source apparatus.

When the distribution management unit 33 determines the distribution source apparatus, the distribution management unit 33 makes the determined distribution source apparatus distribute the advertising content for the advertisement request. For example, the distribution management unit 33 makes a request to the distribution source apparatus for transmitting the advertising content, acquires from the distribution source apparatus the advertising content for the advertisement request, and then transmits the advertising content to the terminal apparatus 6 that made the advertisement request.

Furthermore, the distribution management unit 33 can transmit the URL of the distribution source apparatus to the terminal apparatus 6, which made the advertisement request, to let the terminal apparatus 6 transmit the advertisement request to the distribution source apparatus, for example. The distribution management unit 33 can further make a request to the distribution source apparatus for transmitting the advertising content to make the distribution source apparatus transmit the advertising content for the advertisement request to the terminal apparatus 6 that made the advertisement request.

As in the foregoing, the distribution management unit 33 can select the first advertisement distribution apparatus 4 in the second operating mode even for the users U for whom only the second advertisement distribution apparatus 5 is selected in the first operating mode. This enables the first advertisement distribution apparatus 4 to be selected as the distribution source apparatus for the users U of all the groups, and thus the first advertisement distribution apparatus 4 can collect the information of the users U of all the groups. Consequently, the expected profit value RA can be obtained accurately, whereby the profit from the advertising space can be improved.

Furthermore, the users U to be divided into the groups in the foregoing are not necessary all of the users U of the terminal apparatus 6 that transmits an advertisement request to the advertisement distribution management apparatus 3. For example, the distribution management unit 33 can divide a given ratio (80%, for example) of the users U from among all the users U of the terminal apparatus 6, which transmits an advertisement request to the advertisement distribution management apparatus 3, into the above-described groups. This can also improve the profit from the advertising space 9 according to the given ratio. For example, the distribution management unit 33 can sort only the users U, for whom the numerals of predetermined two consecutive digits (the last two digits, for example) of the hash value correspond to 00 to 79, into the groups.

Moreover, when the second advertisement distribution apparatus 5 that makes the distribution of the advertising content for the advertisement request at the set price rank is not available in the first operating mode, the distribution management unit 33 selects the first advertisement distribution apparatus 4 as the distribution source of the advertising content for the advertisement request. Consequently, setting a price rank in which the profit equal to or higher than the expected profit value RA by the first advertisement distribution apparatus 4 is gained, can improve the profit from the advertising space.

4. Processing Sequence of Advertisement Distribution Management Apparatus 3

Figure 7:
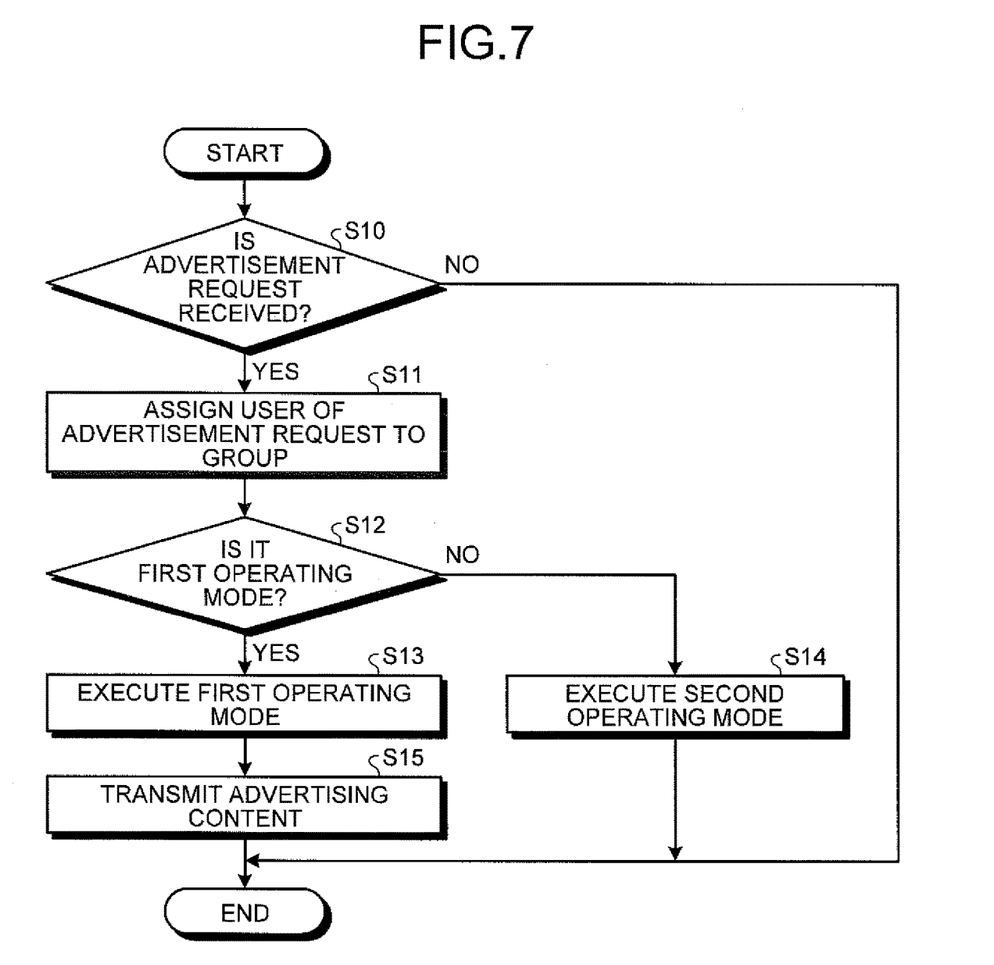
FIG. 7 is a flowchart illustrating one example of information processing performed by the advertisement distribution management apparatus in the embodiment.

Next, described is a procedure for information processing of the advertisement distribution management apparatus 3 in the embodiment. FIG. 7 is a flowchart illustrating one example of the information processing of the advertisement distribution management apparatus 3 in the embodiment. Such operation is the processing repeatedly performed by the controller 12 of the advertisement distribution management apparatus 3.

As illustrated in FIG. 7, the controller 12 of the advertisement distribution management apparatus 3 first determines whether an advertisement request from the terminal apparatus 6 is received (Step S10). If it determines that the advertisement request is received (Yes at Step S10), the controller 12 assigns the user U who made the advertisement request to a group (for example, any one of the groups A to D) (Step S11).

Next, the controller 12 determines whether the operating mode of the group to which the user U is assigned is the first operating mode on the basis of the operating-mode assignment table (Step S12). If it determines that the operating mode of the group is the first operating mode (Yes at Step S12), the controller 12 executes the first operating mode and selects a distribution source apparatus (Step S13). In contrast, if it determines that the operating mode of the group is not the first operating mode (No at Step S12), the controller 12 executes the second operating mode and selects a distribution source apparatus (Step S14).

The controller 12 then makes a request to the distribution source apparatus for transmitting the advertising content, acquires from the distribution source apparatus the advertising content for the advertisement request, and transmits the advertising content to the terminal apparatus 6 that made the advertisement request (Step S15).

If the process at Step S15 is finished, or if the controller 12 determines that an advertisement request is not received at Step S10 (No at Step S10), the controller 12 ends the processing.

5. Other Embodiments

While the first advertisement distribution apparatus 4 is defined as the distribution source apparatus in the second operating mode in the above-described embodiment, a third operating mode in which a specific second advertisement distribution apparatus 5 is defined as a distribution source apparatus may be provided. In this case, the distribution management unit 33, in the same manner as in the second operating mode, divides a plurality of users U into a plurality of groups, and performs an assignment process in which a plurality of time periods shifted from one another within a given period of time are assigned to the respective groups as the time periods of the third operating mode. It is preferable that the time period of the second operating mode and the time period of the third operating mode do not temporally overlap with each other.

Furthermore, while the distribution source apparatus is selected on the basis of the expected profit value of an advertisement distribution apparatus in the first operating mode in the foregoing embodiment, the first operating mode is not limited to such a selection method. For example, the distribution management unit 33 can select the distribution source apparatus in the first operating mode by transmitting a distribution query with a highest set price rank to the first advertisement distribution apparatus 4 and the second advertisement distribution apparatuses 5A to 5C, and by further transmitting distribution queries while lowering the set price rank until a reply indicating that one of the advertisement distribution apparatuses can distribute is received.

6. Effects

The advertisement distribution management apparatus 3 in the embodiment includes the reception unit 31 and the distribution management unit 33. The reception unit 31 receives, from the terminal apparatus 6 of a plurality of users U, advertisement requests for requesting the distribution of advertising content. The distribution management unit 33 selectively executes the first operating mode and the second operating mode depending on the user U who makes the advertisement request. When the first operating mode is selected, the distribution management unit 33 selects a distribution source apparatus of the advertising content for the advertisement request from among the first advertisement distribution apparatus 4 and the second advertisement distribution apparatuses 5A to 5C on the basis of a given condition. The distribution management unit 33 defines the first advertisement distribution apparatus 4 as the distribution source apparatus. The distribution management unit 33 divides the users U into a plurality of groups, and performs an assignment process in which a plurality of time periods TB shifted from one another within a given period of time TA are assigned to the respective groups as the time periods of the second operating mode.

Thus, the first advertisement distribution apparatus 4 is selected for the users U in all the groups in the given period of time TA. Consequently, even for the users U for whom only the second advertisement distribution apparatus 5 is selected in the first operating mode, the first advertisement distribution apparatus 4 is selected in the second operating mode, and thus the estimation accuracy of the expected profit value RA by the first advertisement distribution apparatus 4 can be prevented from deteriorating.

Furthermore, the distribution management unit 33 repeats the process of assigning the users U to the groups according to a given rule.

Consequently, the estimation accuracy of the expected profit value RA by the first advertisement distribution apparatus 4 can be prevented from deteriorating.

The distribution management unit 33 further changes the number of groups, to which the users U are assigned, according to a given rule.

Consequently, the estimation accuracy of the expected profit value RA by the first advertisement distribution apparatus 4 can be prevented from deteriorating while the influence on the first operating mode is reduced.

The distribution management unit 33 obtains a hash value of a user ID included in an advertisement request, and on the basis of the hash value, assigns the user U who makes the advertisement request to a group.

Consequently, the users U who make advertisement requests can be accurately assigned to the groups in a desired ratio.

The advertisement distribution management apparatus 3 in the embodiment includes the estimation unit 32 that estimates the expected profit value RA in the case of distributing advertising content for an advertisement request by the first advertisement distribution apparatus 4. The distribution management unit 33 selects a distribution source apparatus from among the first advertisement distribution apparatus 4 and the second advertisement distribution apparatuses 5A to 5C on the basis of the expected profit value RA in the first operating mode.

Thus, when the second advertisement distribution apparatus 5 that makes the distribution of the advertising content for the advertisement request at the set price rank is available, the distribution management unit 33 can select the second advertisement distribution apparatus 5 as the distribution source of the advertising content for the advertisement request. Consequently, setting a price rank in which the profit equal to or higher than the expected profit value RA by the first advertisement distribution apparatus 4 is gained can improve the profit from the advertising space.

7. Others

While the several embodiments of the present application have been described in detail with reference to the accompanying drawings in the foregoing, those are mere examples, and the invention can be implemented in other forms with various modifications and improvements based on the knowledge of the person skilled in the art including the embodiments described in the disclosure of invention.

The above-described advertisement distribution management apparatus 3 may be implemented with a plurality of server computers, and depending on the function, the configuration thereof can be flexibly changed, such as calling out an external platform by an application programming interface (API) or network computing to implement it, for example. Furthermore, the advertisement distribution management apparatus 3 and the first advertisement distribution apparatus 4 may be implemented with a single server computer.

One aspect of embodiments can provide an advertisement distribution management apparatus, an advertisement distribution system, an advertisement distribution management method, and an advertisement distribution management program that enable profit from advertising space to be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An advertisement distribution management apparatus comprising:
   a network interface configured to communicate with terminal apparatuses of a plurality of users via a network;
   a memory configured to store user information corresponding to each of the users, the user information including information indicating clicks on advertising contents embedded in content spaces in web contents; and
   a processor operatively connected to the network interface and operatively coupled to the memory, the processor being programmed to:
   define a plurality of groups of the users;
   define first and second operating modes as an operating mode;
   for each defined group of users, set one of a plurality of time periods different from each other as a time period of the second operating mode;
   receive an advertisement request for requesting distribution of advertising content to be embedded in a content space in web content from a terminal apparatus of one of the users via the network interface;
   determine whether the received advertisement request was received during the second operating mode time period set for the group of users to which the one user belongs;
   upon a determination that received advertisement request was not received during the second operating mode time period, execute the first operating mode in which a distribution source apparatus of advertising content for the received advertisement request is selected from among a plurality of advertisement distribution apparatuses on the basis of a price information, the price information being set based on the stored user information corresponding to the one user;
   upon a determination that the received advertisement request was received during the second operating mode time period, execute the second operating mode in which a predetermined one of the advertisement distribution apparatuses is predetermined as the distribution source apparatus of advertising content for the received advertisement request, the predetermined advertisement distribution apparatus allowing collection of user information corresponding to the one user, the user information for the collection including information indicating a click on the advertising content for the received advertisement request, and the user information for the collection being stored in the memory in order to update the stored user information; and cause the distribution source apparatus to send the content for the advertisement request to the terminal apparatus of the one user.

2. The advertisement distribution management apparatus according to claim 1, wherein the processor is programmed to repeat the setting of the second operating mode time period for each defined group of users according to a given rule.

3. The advertisement distribution management apparatus according to claim 1, wherein the processor is programmed to change a number of the defined groups of users according to a given rule.

4. The advertisement distribution management apparatus according to claim 1, wherein the processor is programmed to:

obtain a hash value of a user ID included in the advertisement request; and assign the user who makes the advertisement request to one of the defined groups of users on the basis of the hash value.

5. The advertisement distribution management apparatus according to claim 1, wherein the processor is programmed to:

estimate an expected profit value in a case of distributing the advertising content for the advertisement request by the predetermined advertisement distribution apparatus; and select the distribution source apparatus from among the advertisement distribution apparatuses on the basis of the estimated expected profit value in the first operating mode.

6. An advertisement distribution system comprising:

a plurality of advertisement distribution apparatuses configured to distribute advertising content; and an advertisement distribution management apparatus configured to make any of the advertisement distribution apparatuses distribute advertising content corresponding to advertisement requests from terminal apparatuses of a plurality of users, wherein the advertisement distribution management apparatus comprises:

a network interface configured to communicate with terminal apparatuses of a plurality of users via a network;

a memory configured to store user information corresponding to each of the users, the user information including information indicating clicks on advertising contents embedded in content spaces in web contents; and a processor operatively connected to the network interface and operatively coupled to the memory, the processor being programmed to:

define a plurality of groups of the users;

define first and second operating modes as an operating mode;

for each defined group of users, set one of a plurality of time periods different from each other as a time period of the second operating mode;

receive an advertisement request for requesting distribution of advertising content to be embedded in a content space in web content from a terminal apparatus of one of the users via the network interface;

determine whether the received advertisement request was received during the second operating mode time period set for the group of users to which the one user belongs;

upon a determination that received advertisement request was not received during the second operating mode time period, execute the first operating mode in which a distribution source apparatus of advertising content for the received advertisement request is selected from among the plurality of advertisement distribution apparatuses on the basis of a price information, the price information being set based on the stored user information corresponding to the one user;

upon a determination that the received advertisement request was received during the second operating mode time period, execute the second operating mode in which a predetermined one of the advertisement distribution apparatuses is predetermined as the distribution source apparatus of advertising content for the received advertisement request, the predetermined advertisement distribution apparatus allowing collection of user information corresponding to the one user, the user information for the collection including information indicating a click on the advertising content for the received advertisement request, and the user information for the collection being stored in the memory in order to update the stored user information; and cause the distribution source apparatus to send the content for the advertisement request to the terminal apparatus of the one user.

7. An advertisement distribution management method executed by a computer, the advertisement distribution management method comprising:

receiving advertisement requests for requesting distribution of advertising content from terminal apparatuses of a plurality of users;

defining a plurality of groups of the users;

defining first and second operating modes as an operating mode;

for each defined group of users, setting one of a plurality of time periods different from each other as a time period of the second operating mode;

receiving an advertisement request for requesting distribution of advertising content to be embedded in a content space in web content from a terminal apparatus of one of the users via the network interface;

determining whether the received advertisement request was received during the second operating mode time period set for the group of users to which the one user belongs;

upon a determination that received advertisement request was not received during the second operating mode time period, executing the first operating mode in which a distribution source apparatus of advertising content for the received advertisement request is selected from among a plurality of advertisement distribution apparatuses on the basis of a price information, the price information being set based on the stored user information corresponding to the one user;

upon a determination that the received advertisement request was received during the second operating mode time period, executing the second operating mode in which a predetermined one of the advertisement distribution apparatuses is predetermined as the distribution source apparatus of advertising content for the received advertisement request, the predetermined advertisement distribution apparatus allowing collection of user information corresponding to the one user, the user information for the collection including information indicating a click on the advertising content for the received advertisement request, and the user information for the collection being stored in the memory in order to update the stored user information; and causing the distribution source apparatus to send the content for the advertisement request to the terminal apparatus of the one user.

8. The advertisement distribution management method according to claim 7, further comprising:

repeating setting of the second operating mode time period for each defined group of users process according to a given rule.

9. The advertisement distribution management method according to claim 7, further comprising:

changing a number of the defined groups of users according to a given rule.

10. The advertisement distribution management method according to claim 7, further comprising:

obtaining a hash value of a user ID included in the advertisement request; and assigning the user who makes the advertisement request to one of the defined groups of users on the basis of the hash value.

11. The advertisement distribution management method according to claim 7, further comprising estimating an expected profit value in a case of distributing the advertising content for the advertisement request by the predetermined advertisement distribution apparatus; and selecting the distribution source apparatus from among the advertisement distribution apparatuses on the basis of the estimated expected profit value in the first operating mode.

12. A computer readable storage medium containing program instructions for managing an advertisement distribution, wherein execution of the program instructions by one or more processors of a computer system causes the one or more processors to perform:

receiving advertisement requests for requesting distribution of advertising content from terminal apparatuses of a plurality of users;

defining a plurality of groups of the users;

defining first and second operating modes as an operating mode;

for each defined group of users, setting one of a plurality of time periods different from each other as a time period of the second operating mode;

receiving an advertisement request for requesting distribution of advertising content to be embedded in a content space in web content from a terminal apparatus of one of the users via the network interface;

determining whether the received advertisement request was received during the second operating mode time period set for the group of users to which the one user belongs;

upon a determination that received advertisement request was not received during the second operating mode time period, executing the first operating mode in which a distribution source apparatus of advertising content for the received advertisement request is selected from among a plurality of advertisement distribution apparatuses on the basis of a price information, the price information being set based on the stored user information corresponding to the one user;

upon a determination that the received advertisement request was received during the second operating mode time period, executing the second operating mode in which a predetermined one of the advertisement distribution apparatuses is predetermined as the distribution source apparatus of advertising content for the received advertisement request, the predetermined advertisement distribution apparatus allowing collection of user information corresponding to the one user, the user information for the collection including information indicating a click on the advertising content for the received advertisement request, and the user information for the collection being stored in the memory in order to update the stored user information; and causing the distribution source apparatus to send the content for the advertisement request to the terminal apparatus of the one user.

\* \* \* \* \*